(12) United States Patent
Hatakeyama et al.

(10) Patent No.: US 12,085,682 B2
(45) Date of Patent: Sep. 10, 2024

(54) RADIATION MONITORING DEVICE

(71) Applicant: HITACHI, LTD., Tokyo (JP)

(72) Inventors: Shuichi Hatakeyama, Tokyo (JP);
Kouichi Okada, Tokyo (JP); Katsunori Ueno, Tokyo (JP); Takahiro Tadokoro, Tokyo (JP); Yuichiro Ueno, Tokyo (JP); Tooru Shibutani, Tokyo (JP); Keisuke Sasaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 270 days.

(21) Appl. No.: 17/614,410

(22) PCT Filed: May 18, 2020

(86) PCT No.: PCT/JP2020/019634
§ 371 (c)(1),
(2) Date: Nov. 26, 2021

(87) PCT Pub. No.: WO2020/241352
PCT Pub. Date: Dec. 3, 2020

(65) Prior Publication Data
US 2022/0236430 A1    Jul. 28, 2022

(30) Foreign Application Priority Data

May 27, 2019    (JP) .................................. 2019-098193

(51) Int. Cl.
*G01T 1/24*    (2006.01)
*G01T 1/02*    (2006.01)
(Continued)

(52) U.S. Cl.
CPC .............. *G01T 1/247* (2013.01); *G01T 1/023* (2013.01); *G01T 1/366* (2013.01); *G01T 3/085* (2013.01)

(58) Field of Classification Search
CPC ......... G01T 1/247; G01T 1/023; G01T 1/366; G01T 3/085; G01T 1/2008
See application file for complete search history.

(56) References Cited

U.S. PATENT DOCUMENTS 6,392,236 B1    5/2002    Maekawa et al.
7,964,848 B2    6/2011    Hamby et al.
(Continued)

FOREIGN PATENT DOCUMENTS

JP    2001-042043 A    2/2001
JP    2016-114392 A    6/2016
(Continued)

OTHER PUBLICATIONS

International Search Report of PCT/JP2020/019634 dated Jul. 7, 2020.
(Continued)

*Primary Examiner* — Christine S. Kim
(74) *Attorney, Agent, or Firm* — MATTINGLY & MALUR, PC

(57) ABSTRACT

A radiation monitoring device realizes a high measurement function. Therefore, a radiation monitoring device includes: a radiation detection unit including a phosphor that emits light by incident radiation; a photodetector that converts a single photon or a photon group having a plurality of the single photons generated by the radiation detection unit into an electric pulse signal; and an analysis unit that analyzes the electric pulse signal. The phosphor emits light based on a plurality of light emission phenomena having different decay time constants. The analysis unit includes: a signal discrimination circuit that discriminates the electric pulse signal output from the photodetector; a dose rate calculation circuit that calculates a dose rate of the radiation based on a count rate of the discriminated electric pulse signal; and an application energy calculation circuit that calculates application energy of the radiation based on a peak value of the discriminated electric pulse signal.

12 Claims, 7 Drawing Sheets

(51) Int. Cl.
    *G01T 1/36*    (2006.01)
    *G01T 3/08*    (2006.01)

(56) References Cited

U.S. PATENT DOCUMENTS

| | | | |
|---|---|---|---|
| 2011/0101228 A1* | 5/2011 | Hamby | G01T 1/023 |
| | | | 250/362 |
| 2013/0112885 A1 | 5/2013 | Takahashi et al. | |
| 2013/0248721 A1* | 9/2013 | Williams | G01T 1/105 |
| | | | 250/363.01 |
| 2013/0320220 A1 | 12/2013 | Donowsky | |
| 2015/0123002 A1* | 5/2015 | Ueno | G01T 1/105 |
| | | | 250/363.01 |
| 2017/0315241 A1 | 11/2017 | Tadokoro et al. | |

FOREIGN PATENT DOCUMENTS

| | | |
|---|---|---|
| JP | 2017-161378 A | 9/2017 |
| WO | 2012/011506 A1 | 1/2012 |

OTHER PUBLICATIONS

Extended European Search Report received in corresponding European Application No. 20813008.8 dated May 23, 2023.

* cited by examiner

RADIATION MONITORING DEVICE

TECHNICAL FIELD

The present invention relates to a radiation monitoring device.

BACKGROUND ART

Conventionally, an ionization chamber, a GM counter (Geiger-Muller counter), a scintillation detector, and a semiconductor detector are used as a radiation monitor that measures radiation. In particular, a semiconductor detector is applied to a radiation monitor capable of performing measurement under a low dose rate environment. The radiation monitor including the semiconductor detector is utilized in, for example, nuclear power plants, nuclear fuel reprocessing facilities, medical facilities using radioactive isotopes, industrial facilities, research accelerator facilities, general environmental monitoring devices, and the like. The radiation monitor including the semiconductor detector utilizes electron-hole pairs produced by the incidence of radiation to measure a count rate of electric pulses generated by a voltage applied to a semiconductor and a peak value of a signal, thereby calculating a dose rate of the radiation and energy of the incident radiation. Meanwhile, the semiconductor detector applies a high voltage, and thus, there is a risk of explosion when a hydrogen concentration in the air is high. Further, an electric pulse signal generated from the semiconductor is utilized, and thus, there is a possibility that electric noise is transmitted to or received from other measurement instruments. As a detector capable of preventing explosion and suppressing electric noise, for example, an optical fiber-type radiation detector disclosed in PTL 1 is known. The optical fiber-type radiation detector transmits a plurality of photons generated with respect to incident radiation through an optical fiber and measures a dose rate from a single photon count rate, and thus, it is unnecessary to supply power to a radiation detection unit, and the reception and transmission of the electrical noise can be suppressed.

Here, paragraph 0028 of PTL 1 describes that "a light emitting part contains at least one rare earth element. Specifically, the light emitting part is formed of, for example, an optical transmitting material such as transparent yttrium aluminum garnet as a base material and rare earth elements such as ytterbium, neodymium, cerium, and praseodymium contained in the light transmitting material". Further, the Abstract of PTL 2 describes that "provided are: a radiation emitting element that emits light which is a bundle of single photons with respect to incident radiation; a transmission unit that transmits light emitted from the radiation emitting element; an optical filter that decomposes at least a part of the transmitted light into single photons; a conversion unit that converts the respective decomposed photons into electric pulse signals; a counter that counts the electrical pulse signals; and an analysis unit that obtains a dose rate of radiation based on a count of the electric pulse signals."

CITATION LIST

Patent Literature

PTL 1: JP 2016-114392 A
PTL 2: JP 2017-161378 A

SUMMARY OF INVENTION

Technical Problem

Meanwhile, the optical fiber-type radiation detector does not require the supply of power to the radiation detection unit and can suppress the transmission and reception of the electrical noise, and thus, is extremely advantageous as a radiation monitoring device capable of measuring a dose rate in nuclear power plants, nuclear fuel reprocessing facilities, and the like. Further, the optical fiber-type radiation detector can be applied under a high temperature and high dose rate environment where measurement is difficult with conventional techniques, and thus, it is desired to further expand an application destination with an extension of measurement functions of the optical fiber-type radiation detector. For example, measurement of energy of incident radiation is conceivable as the extension of measurement functions. In this case, a light emission phenomenon with a long decay time constant, generated inside a phosphor by the incidence of radiation, is decomposed into single photons and measured in measurement methods described in PTLs 1 and 2, and thus, there is a problem that it is difficult to acquire information on the energy of incident radiation.

This invention has been made in view of the above circumstances, and an object thereof is to provide a radiation monitoring device capable of realizing a high measurement function.

Solution to Problem

In order to solve the above problem, a radiation monitoring device of the present invention includes: a radiation detection unit including a phosphor that emits light by incident radiation; a photodetector that converts a single photon or a photon group having a plurality of the single photons generated by the radiation detection unit into an electric pulse signal; and an analysis unit that analyzes the electric pulse signal. The phosphor emits light based on a plurality of light emission phenomena having different decay time constants. The analysis unit includes: a signal discrimination circuit that discriminates the electric pulse signal output from the photodetector; a dose rate calculation circuit that calculates a dose rate of the radiation based on a count rate of the discriminated electric pulse signal; and an application energy calculation circuit that calculates application energy of the radiation based on a peak value of the discriminated electric pulse signal.

Advantageous Effects of Invention

According to the present invention, a high measurement function can be realized.

DESCRIPTION OF EMBODIMENTS

Hereinafter, various embodiments for carrying out the present invention will be described in detail with reference to the drawings as appropriate.

Note that a "count rate of electric pulse signals" means the number of electric pulse signals measured per unit time in the following description. Further, a "peak value" represents a height of a waveform from the start of rising to the start of falling of an electric pulse signal. Specifically, the "peak value" represents, for example, the maximum height of the waveform (maximum peak value) in the electric pulse signal. Further, a "single photon" indicates each photon generated inside a phosphor by incidence of radiation. Further, a "photon group" indicates a state having two or more single photons as individual photons generated inside the phosphor by the incidence of radiation overlap each other. Further, a "decay time constant" represents the time until an intensity of light emission, which occurs when a fluorescent molecule contained in a phosphor transitions to an excited level by one radiation incidence and transitions from the excited level to a ground level, reaches 1/e (about 0.37 times) from the maximum emission intensity. Note that e is Napier's constant. Further, "a wavelength within a predetermined range" in the present specification refers to a wavelength range that can be transmitted through, for example, an optical filter 41 (see FIG. 12). As a result, for example, photons can be controlled by transmitting only photons in a specific wavelength range.

First Embodiment

Configuration of First Embodiment (Overall Configuration)

Figure 1:
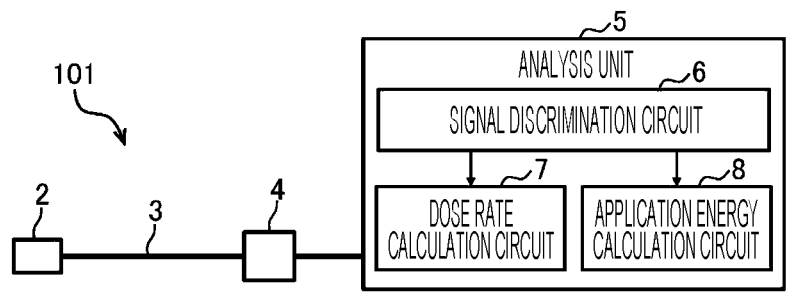
FIG. 1 is a schematic block diagram of a radiation monitoring device according to a first embodiment of the present invention.

FIG. 1 is a schematic block diagram of a radiation monitoring device 101 according to a first embodiment of the present invention.

As illustrated in FIG. 1, the radiation monitoring device 101 schematically includes a radiation detection unit 2, an optical transmission unit 3, a photodetector 4, and an analysis unit 5. Further, the analysis unit 5 includes a signal discrimination circuit 6, a dose rate calculation circuit 7, and an application energy calculation circuit 8. Examples of radiation that can be measured by the radiation monitoring device 101 of the present embodiment include electromagnetic waves, such as X-rays and γ-rays, and particle beams, such as α-rays, β-rays, and neutron rays.

(Radiation Detection Unit 2)

Figure 2:
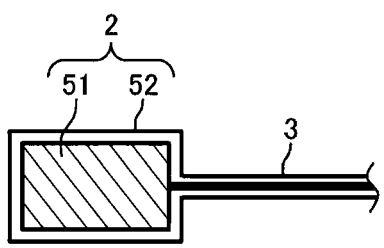
FIG. 2 is a schematic cross-sectional view of a radiation detection unit.

FIG. 2 is a schematic cross-sectional view of the above-described radiation detection unit 2.

As illustrated in FIG. 2, the radiation detection unit 2 includes a phosphor 51 and a housing 52. The phosphor 51 generates light having an intensity corresponding the dose rate of incident radiation. The housing 52 houses the phosphor 51, and the phosphor 51 is connected to the optical transmission unit 3. The phosphor 51 is not particularly limited as long as being a composition in which a plurality of types of light emission phenomena having different decay time constants occur. For example, as the phosphor 51, photoluminescence by light such as ultraviolet rays, radio-luminescence by radiation, cathode-luminescence by an electron beam, electroluminescence by an electric field, chemiluminescence by a chemical reaction, and the like can be applied.

More specifically, as the phosphor 51, for example, light transmitting materials formed of base materials such as NaI, CsI, LiI, SrI$_2$, Bi$_4$Ge$_3$O$_{12}$, Bi$_4$Si$_3$O$_{12}$, CdWO$_4$, PbWO$_4$, ZnS, CaF$_2$, LuAG, LuAP, Lu$_2$O$_3$, Y$_3$Al$_5$O$_{12}$, YAlO$_3$, Lu$_2$SiO$_5$, LYSO, Y$_2$SiO$_5$, Gd$_2$SiO$_5$, BaF$_2$, CeF$_3$, CeBr$_3$, CsF, LiF, Gd$_2$O$_2$S, LaBr$_3$, CeBr$_3$, Gd$_3$Al$_2$Ga$_3$O$_{12}$, Cs$_2$LiYCl$_6$, ScTaO$_4$, LaTaO$_4$, LuTaO$_4$, GdTaO$_4$, YTaO$_4$, Lu$_2$O$_3$, and Lu$_3$Ga$_5$O$_{12}$ can be applied. Alternatively, light transmitting materials, obtained by adding a rare earth element, such as La, Ce, Pr, Nd, Sm, Eu, Gd, Tb, Dy, Ho, Er, Tm, Yb, Lu, and Y, or Tl, Na, Ag, W, CO$_3$, or the like to these optical transmitting materials, can be applied as the phosphor 51. Further, it is also possible to use light emission caused by defects or impurities contained in the base material. Further, it is also possible to generate the plurality of types of light emission phenomena having different decay time constants by adding two or more types of different elements to the base material.

Since the plurality of types of light emission phenomena having different decay time constants occur in the phosphor 51, the radiation monitoring device 101 according to the present embodiment can measure a dose rate and analyze energy of incident radiation based on an output signal of the single radiation detection unit 2. For example, a light-emitting component having a long decay time constant can be easily decomposed into single photons, and thus, can be detected as the electric pulse signal of the single photon in the photodetector 4. Hereinafter, a reason thereof will be described. When the amount of light input from phosphor 51 is relatively large, the amount of light is observed as a continuous waveform in the photodetector 4. Although the light is decayed in the optical transmission unit 3, the amount of light as the decay result is also observed as a continuous waveform in a case where a decayed amount of the optical transmission unit 3 is relatively small. However, if the optical transmission unit 3 is lengthened, the decayed amount increases, and the amount of light as the decay result is observed as a pulse intermittently generated in a spike shape. In such a decay result, each of individual spike-shaped pulses corresponds to the single photon. In this manner, the light-emitting component having the long decay time constant can be easily decomposed into single photons. On the other hand, it is difficult to decompose a light-emitting component having a short decay time constant into single photons, and thus, a photon group is converted into an electric pulse signal having a high peak value in the photodetector 4. The signal discrimination circuit 6 to be described later discriminates an input electric pulse signal, and the dose rate calculation circuit 7 and the application energy calculation circuit 8 calculate a dose rate of radiation and application energy of incident radiation based on the discrimination result.

A method for producing the phosphor 51 is not particularly limited as long as a composition exhibiting luminescence can be grown, and for example, a floating zone method, a Czochralski method (pulling-up method), a micro-pulling-down method, a Bridgman method, a Verneuil method, or the like can be adopted.

A valence of an element ion contained in the phosphor 51 is not particularly limited as long as being available for light emission, and for example, any element ion that is monovalent, divalent, trivalent, tetravalent, or the like can be used.

As described above, the housing 52 is a container that houses the phosphor 51, and a material forming the housing 52 is not particularly limited as long as being capable of transmitting radiation to be measured, and for example, aluminum, stainless steel, or the like can be adopted.

(Optical Transmission Unit 3)

In FIG. 1, the optical transmission unit 3 is connected to the radiation detection unit 2 and the photodetector 4, and transmits light emitted from the phosphor 51 (see FIG. 2). The optical transmission unit 3 is not particularly limited as long as being capable of transmitting the light emitted from the phosphor 51, and for example, an optical fiber, a light guide, or the like can be adopted. Further, examples of a material forming the optical fiber, the light guide, or the like include quartz, plastic, and the like.

(Photodetector 4)

The photodetector 4 is connected to the optical transmission unit 3 and the analysis unit 5, converts a photon transmitted from the optical transmission unit 3 into an electric pulse signal, and supplies the electric pulse signal to the analysis unit 5. As the photodetector 4, for example, a photomultiplier tube, an avalanche photodiode, or the like can be adopted. More specifically, the photodetector 4 converts a single photon or a photon group into a series of current-amplified current pulse signals and outputs the signals.

(Analysis Unit 5)

The analysis unit 5 is a device that counts and analyzes an electric pulse signal input from the photodetector 4. In the analysis unit 5, the signal discrimination circuit 6 is connected to the photodetector 4 and discriminates the electric pulse signal input from the photodetector 4. Here, "discriminating" is a generic term for the meaning of "determining whether an electrical pulse signal is caused by a single photon or a photon group" and the meaning of "separating the electrical pulse signal into a component based on the single photon and a component based on the photon group".

Further, the dose rate calculation circuit 7 calculates the dose rate of radiation based on the discrimination result of the signal discrimination circuit 6. Further, the application energy calculation circuit 8 calculates the application energy applied to the incident radiation based on the discrimination result of the signal discrimination circuit 6.

(Signal Discrimination Circuit 6)

As described above, the signal discrimination circuit 6 has a function of discriminating the electric pulse signal input from the photodetector 4. A method for discriminating the electric pulse signal is not particularly limited as long as the electric pulse signal input from the photodetector 4 can be discriminated, but for example, the following discrimination methods are conceivable.

(1) Discrimination Based on Peak Value of Signal

First, a measured electric pulse signal can be discriminated by comparing a peak value of the electric pulse signal with a predetermined peak value threshold. Here, the peak value threshold may be a preset value or a value calculated using the measured electric pulse signal. When the peak value threshold is determined by calculation, a method for the calculation is not particularly limited as long as a peak value of a signal can be calculated. For example, the peak value threshold can be calculated using the maximum channel in which a tail of a statistical distribution of count values of single photons spreads on a peak value spectrum, or a statistical model, such as a binomial distribution, a Poisson distribution, and a Gaussian distribution (normal distribution).

In this case, when the peak value of the electric pulse signal input from the photodetector 4 is less than the peak value threshold, the signal discrimination circuit 6 discriminates the electric pulse signal as a signal of a single photon. Conversely, when the peak value of the electric pulse signal is equal to or more than the peak value threshold, the electric pulse signal is discriminated as a signal of a photon group. In this manner, when an appropriate peak value threshold is set such that it is possible to discriminate whether the factor of the electric pulse signal is the single photon or the photon group, the calculation accuracy of the dose rate and the application energy in the radiation monitoring device 101 can be improved. Note that, in the following description, the electric pulse signal caused by the single photon will be referred to as a single photon electric pulse signal, and the electric pulse signal caused by the photon group will be referred to as a photon group electric pulse signal.

(2) Determination Based on Time Width of Signal

Further, a measured electric pulse signal can be discriminated by comparing a signal time width of the electric pulse signal with a predetermined time width threshold. Here, the signal time width of the electric pulse signal is a time width in which a peak value of the electric pulse signal is equal to or more than a predetermined value. The time width threshold may be a preset value or a value calculated using the measured electric pulse signal. When the time width threshold is determined by calculation, a method for the calculation is not particularly limited as long as a time width can be calculated. For example, the time width threshold can be calculated using the time from a rise start time to a fall of the electric pulse signal measured by the photodetector 4, the time until a peak value reaches 1/e times (about 0.37 times) the maximum peak value since the rise start time, or the like.

In this case, when the signal time width of the electric pulse signal input from the photodetector 4 is less than the time width threshold, the signal discrimination circuit 6 discriminates the electric pulse signal as the single photon electric pulse signal. Conversely, when the signal time width of the electric pulse signal is equal to or more than the time width threshold, the electric pulse signal is discriminated as the photon group electric pulse signal. In this manner, when an appropriate time width threshold is set such that it is possible to discriminate whether the factor of the electric pulse signal is the single photon or the photon group, the calculation accuracy of the dose rate and the application energy in the radiation monitoring device 101 can be improved.

(3) Discrimination Based on Integral Value of Signal

Further, a measured electric pulse signal can be discriminated by comparing an integration result of a peak value of an electric pulse signal with a predetermined integration result threshold. The integration result threshold may be a preset value or a value calculated using the measured electric pulse signal. When the integration result threshold is determined by calculation, a method for the calculation is not particularly limited as long as an integration result can be calculated.

For example, the integration result threshold can be calculated using an integral value from a rise start time to a fall of the electric pulse signal measured by the photodetector 4, an integral value until a peak value reaches the maximum peak value since the rise start time of the electric pulse signal, an integral value until the peak value reaches 1/e (about 0.37 times) of the maximum peak value of the maximum peak value since the rise start time, or the like.

In this case, when the integration result of the peak value of the electric pulse signal is less than the integration result threshold, the signal discrimination circuit 6 discriminates that the electric pulse signal is the single photon electric pulse signal. Conversely, when the integration result of the peak value of the electric pulse signal is equal to or more than the integration result threshold, the electric pulse signal is discriminated as the photon group electric pulse signal. In this manner, when an appropriate integration result threshold is set such that it is possible to discriminate whether the factor of the electric pulse signal is the single photon or the photon group, the calculation accuracy of the dose rate and the application energy in the radiation monitoring device 101 can be improved.

(4) Discrimination by Filtering

Further, an electric pulse signal can be filtered, and the electric pulse signal can be discriminated based on a result thereof. The filtering is not particularly limited as long as a signal can be discriminated based on a frequency characteristic of the electric pulse signal, and for example, a low-pass filter, a high-pass filter, a band-pass filter, a band-elimination filter, an all-pass filter, a comb filter, a multi-band filter, or the like can be adopted.

When the factor of the electric pulse signal is the single photon, the electric pulse signal becomes pulses generated intermittently in spike shapes, and thus, a frequency band thereof is relatively high. On the other hand, when the factor of the electric pulse signal is the photon group, a frequency band of the electric pulse signal is relatively low. In this manner, when appropriate filtering is performed such that it is possible to discriminate whether the factor of the electric pulse signal is the single photon or the photon group, the calculation accuracy of the dose rate and the application energy in the radiation monitoring device 101 can be improved.

(5) Discrimination Based on Peak Value Spectrum

Figure 3:
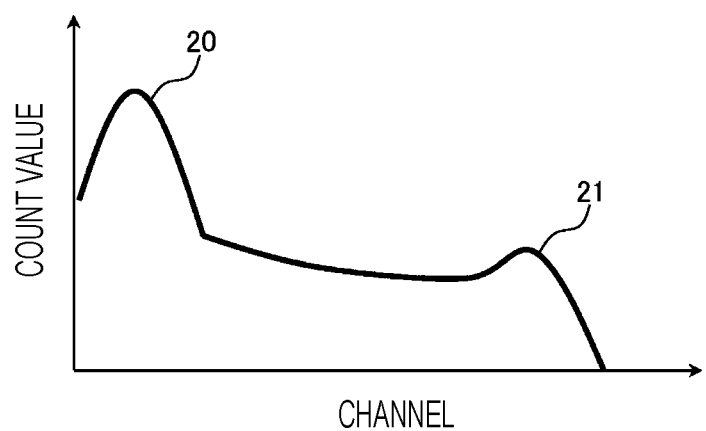
FIG. 3 is a view illustrating an example of a peak value spectrum of an electric pulse signal.

FIG. 3 is a view illustrating an example of a peak value spectrum of an electric pulse signal.

A "channel" on a horizontal axis in FIG. 3 is obtained by dividing the peak value of the electric pulse signal output from the photodetector 4 for each predetermined range. The peak value increases toward the right on the horizontal axis. Further, a vertical axis in FIG. 3 represents a count value of each channel. In the illustrated example, there are two count peaks 20 and 21 in the peak value spectrum. Here, the count peak 21 on the higher peak value side is considered to be caused by the photon group and corresponds to a count peak supplied to the application energy calculation circuit 8. Further, the count peak 20 on the lower peak value side is considered to be caused by the single photon, and thus, is supplied to the dose rate calculation circuit 7.

In other words, when the signal discrimination circuit 6 discriminates the count value based on the peak value spectrum, results thereof appear as the count peaks 20 and 21. When the dose rate calculation circuit 7 may calculate the dose rate of radiation based on the count value of the count peak 20 when converting the dose rate of radiation from a count rate of single photons. Further, the application energy calculation circuit 8 may calculate the application energy based on a peak position related to the measured count peak 21, that is, the peak value corresponding to the channel. Note that a method for calculating the count peaks 20 and 21 is not particularly limited as long as a peak position can be calculated by the method. For example, the count peaks 20 and 21 can be calculated using a channel position indicating the maximum count value or a statistical model such as a binomial distribution, a Poisson distribution, and a Gaussian distribution (normal distribution).

As the method for discriminating the electric pulse signal, a method other than (1) to (5) described above can also be adopted. In any method, a hardware configuration of the signal discrimination circuit 6 is not particularly limited as long as an electric pulse signal can be discriminated. For example, circuit elements, such as a transistor, a resistor, a condenser, a coil, a transformer, a capacitor, a diode, and an operational amplifier having the above-described functions, a digital signal processor, a multi-channel analyzer, a personal computer, and the like can be applied to the signal discrimination circuit 6.

(Dose Rate Calculation Circuit 7)

The dose rate calculation circuit 7 converts the dose rate of radiation from the count rate of the single photon electric pulse signal discriminated by the signal discrimination circuit 6. The dose rate calculation circuit is not particularly limited as long as a dose rate of radiation can be converted from a count rate of single photons discriminated by the signal discrimination circuit 6. For example, circuit elements, such as a transistor, a resistor, a condenser, a coil, a transformer, a capacitor, a diode, and an operational amplifier having the above-described functions, a digital signal processor, a multi-channel analyzer, a personal computer, or the like can be adopted as the dose rate calculation circuit 7.

A general method for obtaining the dose rate of radiation is to convert a dose rate of radiation from a count rate of γ-rays or the like. A method of the present embodiment uses a plurality of types of light emission having different time constants generated in the phosphor 51 by incidence of γ-rays or the like, which is different from the general method. That is, the dose rate calculation circuit 7 calculates the dose rate of radiation from the count rate of the single photon electric pulse signal. Further, the application energy calculation circuit 8 calculates the application energy based on a peak value of a photon group electric pulse signal or the like.

Figure 4:
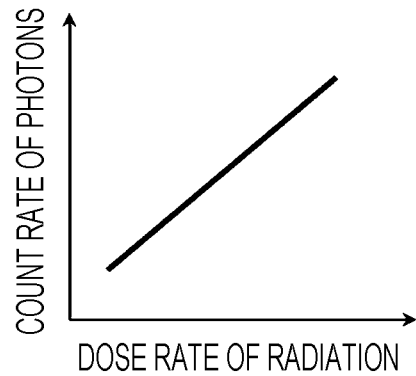
FIG. 4 is a schematic view illustrating an example of a relationship between a dose rate of radiation and a count rate of single photons.

FIG. 4 is a schematic view illustrating an example of a relationship between the dose rate of radiation and the count rate of photons (single photons). As illustrated in FIG. 4, the dose rate of radiation can be calculated and acquired if the count rate of single photons can be measured. As described above, a light-emitting component having a long decay time constant is easily decomposed into single photons among the plurality of types of light emission having different time constants generated by the phosphor 51, and thus, the generation probability of the single photon increases. Therefore, the measurement accuracy, detection sensitivity, and measurement dynamic range of the dose rate can be improved by utilizing the light-emitting component having the long decay time constant for the calculation of the dose rate.

(Application Energy Calculation Circuit 8)

Returning to FIG. 1, the application energy calculation circuit 8 calculates the energy applied to the phosphor 51 by the incident radiation based on the photon group electric pulse signal discriminated by the signal discrimination circuit 6. A method for calculating the application energy is not particularly limited as long as the energy applied to the phosphor 51 can be calculated, and for example, the calculation can be performed using the peak value spectrum (see FIG. 3) of the photon group electric pulse signal discriminated by the signal discrimination circuit 6.

A hardware configuration of the application energy calculation circuit 8 is not particularly limited as long as the energy applied to the phosphor 51 can be calculated. For example, circuit elements, such as a transistor, a resistor, a condenser, a coil, a transformer, a capacitor, a diode, and an operational amplifier having the above-described functions, a digital signal processor, a multi-channel analyzer, a personal computer, or the like can be adopted as the application energy calculation circuit 8.

Figure 5:
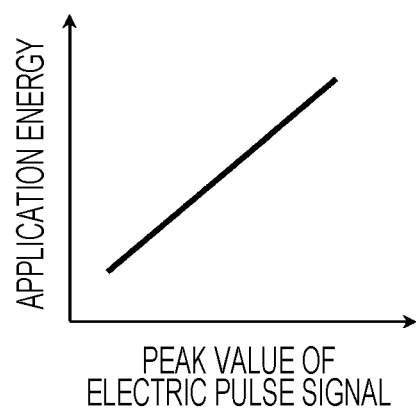
FIG. 5 is a schematic view illustrating an example of a relationship between a peak value of an electric pulse signal and application energy.

FIG. 5 is a schematic view illustrating an example of a relationship between the peak value of the electric pulse signal and the application energy.

As illustrated in FIG. 5, the peak value of the electric pulse signal detected by the photodetector 4 and the energy applied to the phosphor 51 have a substantially proportional relationship. Therefore, the application energy of radiation can be calculated from the peak value of the electric pulse signal calculated by using this relationship. Since it is difficult to decompose a light-emitting component having a short decay time constant among the plurality of types of light emission having different time constants generated by the phosphor 51 (see FIG. 2) into single photons, the photodetector 4 detects the photon group as the electric pulse signal having the high peak value. Therefore, the radiation detection unit 2 as the single element can measure the dose rate and analyze the energy of the incident radiation when the light-emitting component having the long decay time constant is used to calculate the dose rate of radiation and the light-emitting component having the short decay time constant is used to calculate the application energy of radiation. Furthermore, the measurement accuracy of the dose rate can be improved based on information on the calculated application energy.

Operation of First Embodiment

Figure 6:
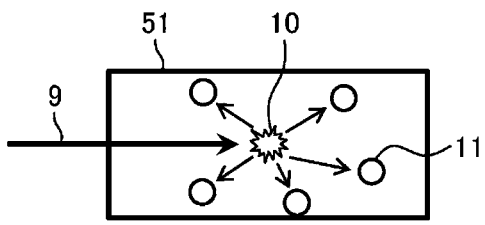
FIG. 6 is a schematic view illustrating an example of a light generation process when radiation is incident on a phosphor.

Next, an operation of the radiation monitoring device 101 of the present embodiment will be described. FIG. 6 is a schematic view illustrating an example of a light generation process when radiation 9 is incident on the phosphor 51.

In FIG. 6, an interaction 10 occurs when the radiation 9 is incident on the phosphor 51. With this interaction 10, a plurality of single photons 11 are generated. A light-emitting component having a long decay time constant allows the photodetector 4 to detect the individual single photons 11 generated by the interaction 10. Further, the single photons 11 generated by the interaction 10 overlap each other, and thus, a light-emitting component having a short decay time constant can be detected by the photodetector 4 as a signal having a high peak value formed of a photon group.

Figure 7:
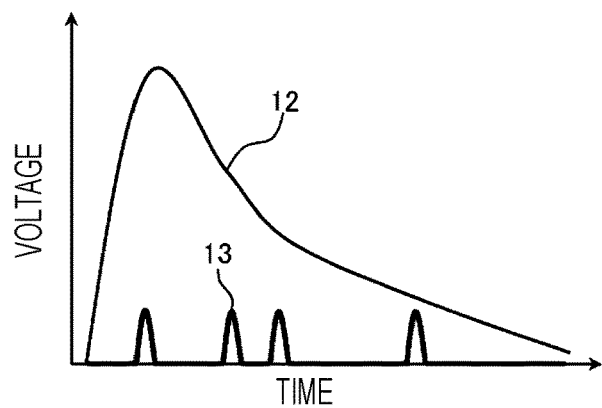
FIG. 7 is schematic waveform diagrams of electric pulse signals.

FIG. 7 is schematic waveform diagrams of electric pulse signals 12 and 13.

The electric pulse signal 13 is a waveform in a case where it is assumed that an output of the photodetector is measured using a phosphor in which a light emission phenomenon having a long decay time constant occurs. On the other hand, the electric pulse signal 12 is a waveform in a case where it is assumed that an output of the photodetector is measured using a phosphor in which a light emission phenomenon having a short decay time constant occurs.

If a light emission phenomenon having a short decay time constant occurs in the phosphor 51 when one beam of radiation 9 (see FIG. 6) is incident on the phosphor 51, a photon group, which is a set of a plurality of generated single photons 11, is generated. The photon group can be measured by the photodetector 4 as one electric pulse signal 12 as illustrated in FIG. 7, for example. On the other hand, if a light emission phenomenon having a long decay time constant occurs in the phosphor 51, the individual single photons 11 transmitted from the optical transmission unit 3 are discretely measured by the photodetector 4. These single photons 11 can be measured by the photodetector 4 as a series of the electrical pulse signals 13 having a time width of about 2 ns, for example, as illustrated in FIG. 7.

Figure 8:
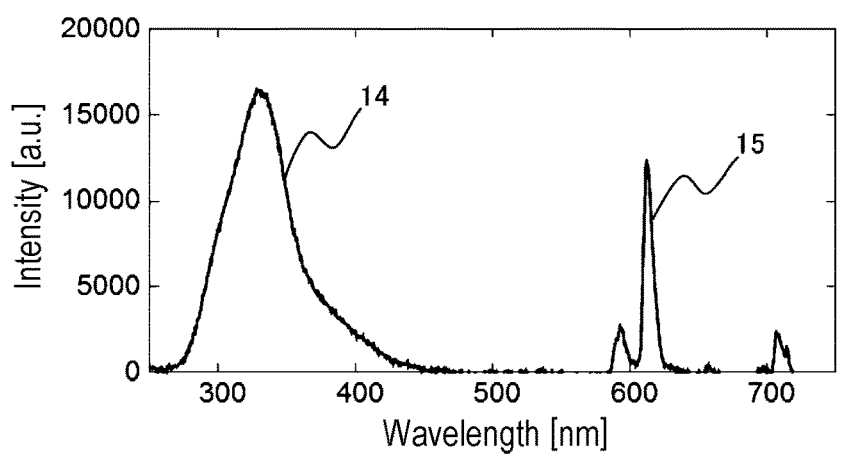
FIG. 8 is a view illustrating an example of a waveform spectrum of light in a case where a plurality of light emission phenomena having different decay time constants occur.

FIG. 8 is a view illustrating an example of a waveform spectrum of light in a case where a plurality of light emission phenomena having different decay time constants occurs. In FIG. 8, a horizontal axis represents a wavelength of light, and a vertical axis represents an intensity.

In general, light emission phenomena with different decay time constants have different emission wavelengths due to different transition processes of fluorescent molecules. For example, in FIG. 8, a light-emitting component 14 whose wavelength is less than 500 nm is a light-emitting component caused by the influence of an element, a defect, or an impurity contained in a base material, and is accompanied by a light emission phenomenon having a short decay time constant.

On the other hand, a light-emitting component 15 whose wavelength is equal to or more than 500 nm is a light-emitting component caused by the influence of an element added to the base material, and is accompanied by a light emission phenomenon having a long decay time constant. Note that lengths of the decay time constants of the light-emitting components 14 and 15 are not limited to the above-described examples. For example, the light-emitting component 14 may be accompanied by a light emission phenomenon having a long decay time constant, and the light-emitting component 15 may be accompanied by a light emission phenomenon having a short decay time constant.

Figure 9:
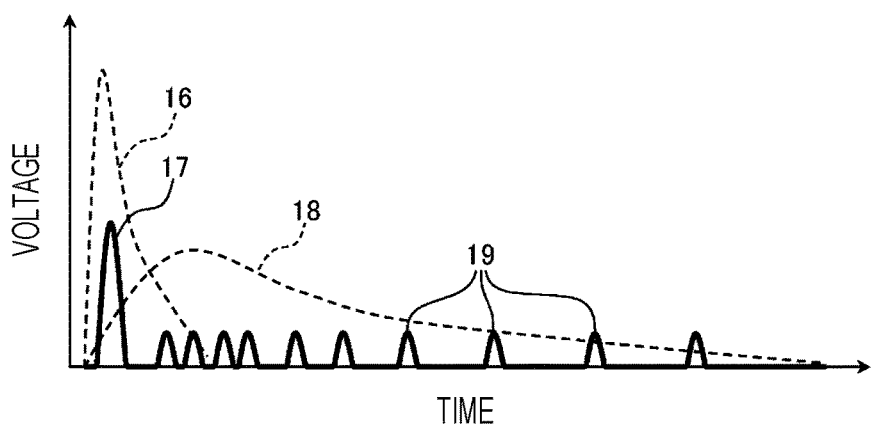
FIG. 9 is a view illustrating waveform examples of electric pulse signals in a case of using a phosphor in which a plurality of light emission phenomena having different decay time constants occur.

FIG. 9 is a view illustrating waveform examples of electric pulse signals in a case of using the phosphor in which a plurality of light emission phenomena having different decay time constants occur. Typically, a light-emitting component having a short decay time constant is measured as a signal having a high peak value and a short signal time width, for example, an electric pulse signal 16 illustrated in the drawing. Further, a light-emitting component having a long decay time constant is measured as a signal having a low peak value and a long signal time width, for example, an electric pulse signal 18 illustrated in the drawing.

The light-emitting component having the short decay time constant is hardly decomposed into single photons, and thus, is measured by the photodetector 4 as a signal having a high peak value corresponding to a photon group, for example, an electric pulse signal 17 illustrated in the drawing. On the other hand, the light-emitting component having the long decay time constant is easily decomposed into single photons, and thus, is measured by the photodetector 4 as electric pulse signals 19 intermittently generated in spike shapes corresponding to the individual single photons 11 (see FIG. 6).

In this manner, both the measurement of the dose rate and the analysis of the energy of the incident radiation can be realized by the single element when the light-emitting component having the long decay time constant is used to calculate the dose rate of radiation and the light-emitting component having the short decay time constant is used to calculate the application energy of radiation. Furthermore, the measurement accuracy of the dose rate can be improved based on information on the calculated application energy.

Next, preferred usage examples of the radiation monitoring device 101 will be described.

Figure 10:
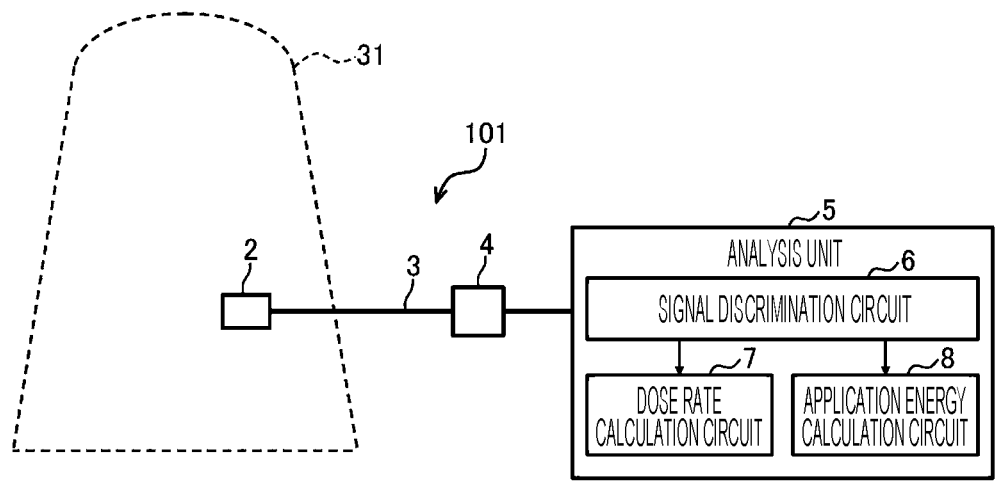
FIG. 10 is a schematic view illustrating a usage example of the radiation monitoring device in FIG. 1.

FIG. 10 is a schematic view illustrating a usage example of the radiation monitoring device 101. As illustrated in FIG. 10, the radiation detection unit 2 is installed in a predetermined area 31 to be measured, the photodetector 4 and elements in the subsequent stages are installed outside the area to be measured, and the optical transmission unit 3 connects the radiation detection unit 2 and the photodetector 4. As a result, it is possible to remotely realize the measurement of the dose rate and energy analysis of internal radiation in real time in, for example, nuclear power plants or nuclear fuel reprocessing facilities having a reactor pressure vessel, a reactor containment vessel, and a reactor building that reach a high temperature and high dose rate environment, medical facilities, industrial facilities, and research accelerator facilities using radioisotopes.

Figure 11:
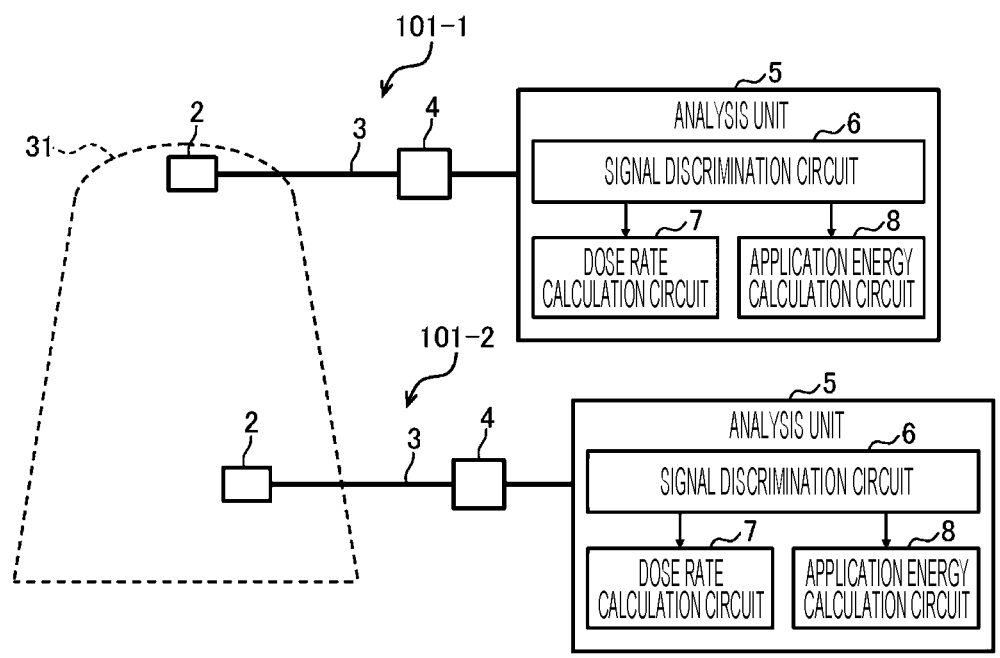
FIG. 11 is a schematic view illustrating another usage example of the radiation monitoring device in FIG. 1.

FIG. 11 is a schematic view illustrating another usage example of the radiation monitoring device 101.

In FIG. 11, each of two radiation monitoring devices 101-1 and 101-2 is similar to the radiation monitoring device 101 described above. As illustrated in the drawing, a total of two radiation detection units 2 included in the radiation monitoring devices 101-1 and 101-2 are installed at different positions in the area 31 to be measured. The radiation monitoring devices 101-1 and 101-2 measure a dose rate and energy of the area 31 to be measured. Note that the two radiation monitoring devices 101-1 and 101-2 are applied in FIG. 11, but the number of the radiation monitoring devices 101 may be three or more. Since the plurality of radiation monitoring devices 101 are applied in this manner, it is possible to measure a dose rate distribution and an energy distribution in the area 31 to be measured. Due to these effects, the radiation monitoring device 101 can be applied to nuclear power plants, nuclear fuel reprocessing facilities, medical facilities using radioactive isotopes, industrial facilities, research accelerator facilities, general environmental monitoring devices, and the like.

Effect of First Embodiment

As described above, according to the present embodiment, the phosphor 51 of the radiation detection unit emits light based on the plurality of light emission phenomena having different decay time constants, and the analysis unit 5 includes the signal discrimination circuit 6 that discriminates the electric pulse signal output from the photodetector 4; the dose rate calculation circuit 7 that calculates the dose rate of radiation based on the count rate of the discriminated electric pulse signal; and the application energy calculation circuit 8 that calculates the application energy of radiation based on the peak value of the discriminated electric pulse signal.

Therefore, according to the present embodiment, the measurement of the dose rate and the analysis of the energy of the incident radiation can be realized based on the light emission of the radiation detection unit 2 as the single element, the measurement accuracy of the dose rate can be improved, and a high measurement function can be realized.

Further, according to the present embodiment, the relationship between the peak value of the electric pulse signal and the predetermined peak value threshold, the relationship between the time width of the electric pulse signal and the predetermined time width threshold, the relationship between the integration result of the electric pulse signal and the predetermined integration result threshold, the frequency characteristic of the electric pulse signal, the peak value spectrum of the electric pulse signal, or the like can be applied for the method for discriminating the electric pulse signal by the signal discrimination circuit 6. As a result, the electric pulse signal can be discriminated by an optimum method according to an application.

Further, according to the above-described usage examples, the radiation detection unit 2 is provided inside the predetermined area 31 to be measured, the photodetector 4 and the analysis unit 5 are provided outside the area 31 to be measured, and the optical transmission unit 3 that connects the radiation detection unit 2 and the photodetector 4 is provided. As a result, even when the area 31 to be measured is under the high temperature and high dose rate environment or the like, an internal state of the area 31 to be measured can be safely measured from the outside of the area 31 to be measured.

Second Embodiment

Figure 12:
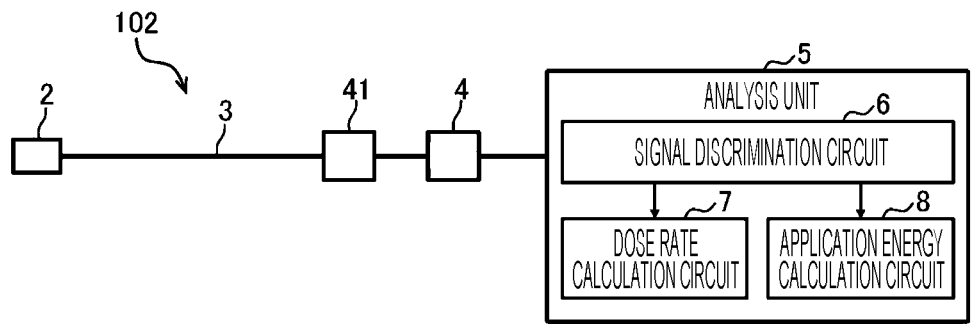
FIG. 12 is a schematic block diagram of a radiation monitoring device according to a second embodiment.

FIG. 12 is a schematic block diagram of a radiation monitoring device 102 according to a second embodiment of the present invention. Note that parts corresponding to the respective units of the first embodiment will be denoted by the same reference signs in the following description, and descriptions thereof will be omitted in some cases.

The radiation monitoring device 102 is different from the radiation monitoring device 101 of the first embodiment (see FIG. 1) in that an optical filter 41 is provided between the optical transmission unit 3 and the photodetector 4. Note that configurations of the radiation detection unit 2, the optical transmission unit 3, the photodetector 4, the analysis unit 5, the signal discrimination circuit 6, the dose rate calculation circuit 7, and the application energy calculation circuit 8 are similar to those of the first embodiment.

The optical filter 41 is a device that performs filtering on a photon transmitted from the optical transmission unit 3. The filtering refers to, for example, processing of attenuating the number of photons or selectively transmitting light having a wavelength within a predetermined range. Since the optical filter 41 has the function of attenuating the number of photons in this manner, pile-up of single photons can be reduced, so that it is possible to improve calculation accuracy of a dose rate and to expand a measurement dynamic range. Further, since the optical filter 41 has the function of transmitting the wavelength within the predetermined range, it is possible to optically discriminate a plurality of types of light emission having different decay time constants generated in the phosphor 51 and to improve measurement accuracy of the dose rate and accuracy of energy analysis.

Note that the "wavelength within the predetermined range" as described above indicates, for example, a wavelength range that can be transmitted through the optical filter 41. As a result, for example, photons can be controlled by transmitting only photons in a specific wavelength range. As the optical filter 41, for example, a wavelength filter, an attenuation filter, or the like can be adopted. The wavelength filter is a filter capable of transmitting only photons within a predetermined wavelength range. The attenuation filter is a filter that attenuates the number of photons of light with a predetermined probability. Further, it is also possible to use two or more optical filters in combination.

Since the optical filter 41 that performs filtering on the photon transmitted from the radiation detection unit 2 is further provided according to the present embodiment as described above, an effect that the number of photons can be appropriately controlled according to a discrimination content is achieved, in addition to effects similar to those of the first embodiment.

For example, when the number of photons is attenuated in the optical filter 41, the pile-up of single photons can be reduced, so that it is possible to improve the calculation accuracy of the dose rate and to expand the measurement dynamic range. Further, the photon in the wavelength within the predetermined range is transmitted through the optical filter 41, and thus, it is possible to optically discriminate a plurality of light emission phenomena having different decay time constants generated in the phosphor 51 and to further improve the measurement accuracy of the dose rate and the accuracy of energy analysis.

Third Embodiment

Figure 13:
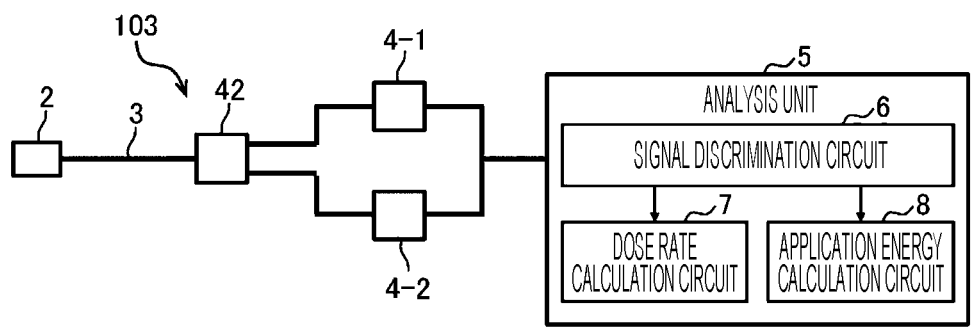
FIG. 13 is a schematic block diagram of a radiation monitoring device according to a third embodiment.

FIG. 13 is a schematic block diagram of a radiation monitoring device 103 according to a third embodiment of the present invention. Note that parts corresponding to the respective units of the other embodiments described above will be denoted by the same reference signs in the following description, and descriptions thereof will be omitted in some cases.

The radiation monitoring device 103 is different from the radiation monitoring device 101 of the first embodiment (see FIG. 1) in terms of including an optical branching device 42 and a plurality of (two in the illustrated example) photodetectors 4-1 and 4-2. The photodetectors 4-1 and 4-2 are configured similarly to the photodetector 4. However, it is preferable that characteristics of the photodetectors 4-1 and 4-2 be different. Note that the radiation detection unit 2, the optical transmission unit 3, the analysis unit 5, the signal discrimination circuit 6, the dose rate calculation circuit 7, and the application energy calculation circuit 8 are similar to those of the first embodiment.

The optical branching device 42 is a device that is connected between the optical transmission unit 3, and the photodetectors 4-1 and 4-2 and divides photons transmitted from the optical transmission unit 3 into the plurality of (two in the illustrated example) photodetectors 4-1 and 4-2. The optical branching device 42 is not particularly limited as long as the transmitted photons can be divided, and for example, an optical switch, an optical coupler, an optical splitter, or the like can be adopted.

As described above, according to the present embodiment, the optical branching device 42 that divides the photons transmitted from the radiation detection unit 2 is further provided, the plurality of photodetectors 4-1 and 4-2 are provided, and each of the photons divided by the optical branching device 42 is converted into an electric pulse signal.

As a result, it is possible to apply optimum photodetector characteristics in the photodetectors 4-1 and 4-2 for each path of the divided photons and to further improve measurement accuracy of a dose rate and accuracy of energy analysis, in addition to the effects similar to those of the first embodiment.

Fourth Embodiment

Figure 14:
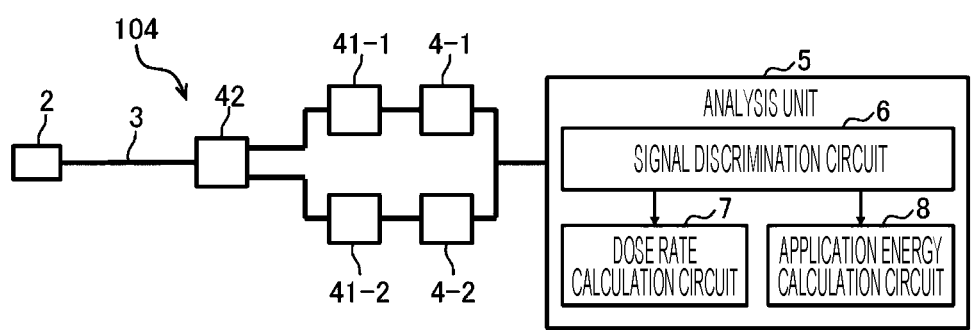
FIG. 14 is a schematic block diagram of a radiation monitoring device according to a fourth embodiment.

FIG. 14 is a schematic block diagram of a radiation monitoring device 104 according to a fourth embodiment of the present invention. Note that parts corresponding to the respective units of the other embodiments described above will be denoted by the same reference signs in the following description, and descriptions thereof will be omitted in some cases.

The radiation monitoring device 104 is different from the radiation monitoring device 101 of the first embodiment (see FIG. 1) in terms of including the optical branching device 42, a plurality of (two in the illustrated example) optical filters 41-1 and 41-2, and the plurality of (two in the illustrated example) photodetectors 4-1 and 4-2.

The optical branching device 42 and the photodetectors 4-1 and 4-2 are configured similarly to those of the third embodiment (see FIG. 13). Further, the optical filters 41-1 and 41-2 are configured similarly to the optical filter 41 of the second embodiment (see FIG. 12). Note that the radiation detection unit 2, the optical transmission unit 3, the analysis unit 5, the signal discrimination circuit 6, the dose rate calculation circuit 7, and the application energy calculation circuit 8 are similar to those of the first embodiment. The optical filters 41-1 and 41-2 are devices that attenuate the number of photons or transmit a wavelength within a predetermined range for photons in each path divided by the optical branching device 42. The photons processed by the optical filters 41-1 and 41-2 are supplied to the photodetectors 4-1 and 4-2, respectively.

Since the plurality of (two in the illustrated example) optical filters 41-1 and 41-2 are provided according to the present embodiment as described above, the optimum filter characteristic different for each path of the divided photons can be applied to each of the optical filters 41-1 and 41-2. As a result, according to the present embodiment, an effect that it is possible to further improve measurement accuracy of a dose rate and accuracy of energy analysis is achieved, in addition to the effects similar to those of the first embodiment.

Fifth Embodiment

Figure 15:
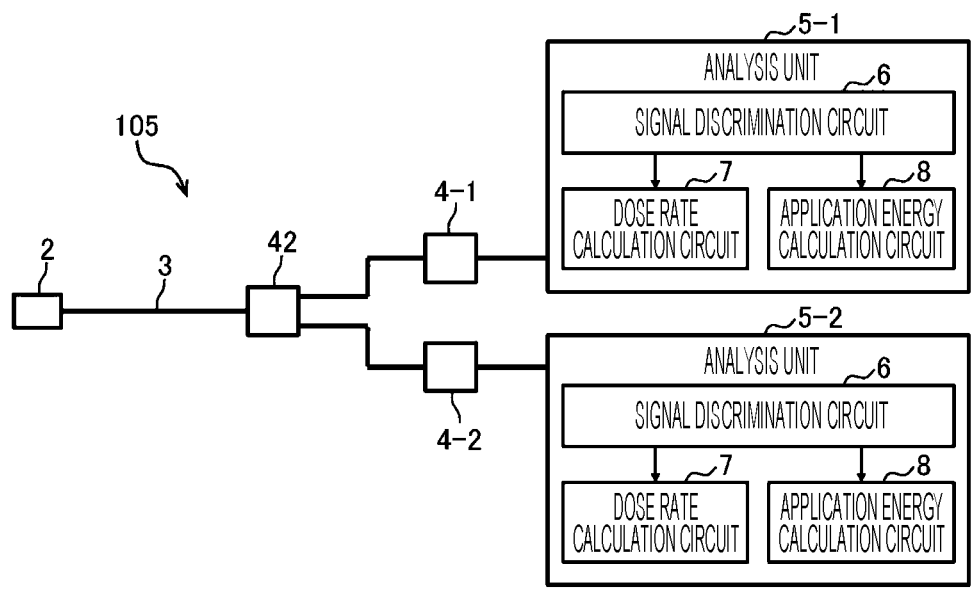
FIG. 15 is a schematic block diagram of a radiation monitoring device according to a fifth embodiment.

FIG. 15 is a schematic block diagram of a radiation monitoring device 105 according to a fifth embodiment of the present invention. Note that parts corresponding to the respective units of the other embodiments described above will be denoted by the same reference signs in the following description, and descriptions thereof will be omitted in some cases.

The radiation monitoring device 105 is different from the radiation monitoring device 101 of the first embodiment (see FIG. 1) in terms of including the optical branching device 42, the plurality of (two in the illustrated example) photodetectors 4-1 and 4-2, and a plurality of (two in the illustrated example) analysis units 5-1 and 5-2.

The optical branching device 42 and the photodetectors 4-1 and 4-2 are configured similarly to those of the third embodiment (see FIG. 13). Further, the analysis units 5-1 and 5-2 are configured similarly to the analysis unit 5 of the first embodiment. However, it is preferable that characteristics of the photodetectors 4-1 and 4-2 and characteristics of the analysis units 5-1 and 5-2 be different.

As described above, according to the present embodiment, the plurality of analysis units 5-1 and 5-2 are provided to correspond to the photodetectors 4-1 and 4-2, and the plurality of photodetectors 4-1 and 4-2 are connected to the corresponding analysis units 5-1 and 5-2, respectively. Therefore, the optimum characteristic different for each path of divided photons can be imparted to each of the photodetectors 4-1 and 4-2 and each of the analysis units 5-1 and 5-2. As a result, according to the present embodiment, an effect that it is possible to further improve measurement accuracy of a dose rate and accuracy of energy analysis is achieved, in addition to the effects similar to those of the first embodiment.

Sixth Embodiment

Figure 16:
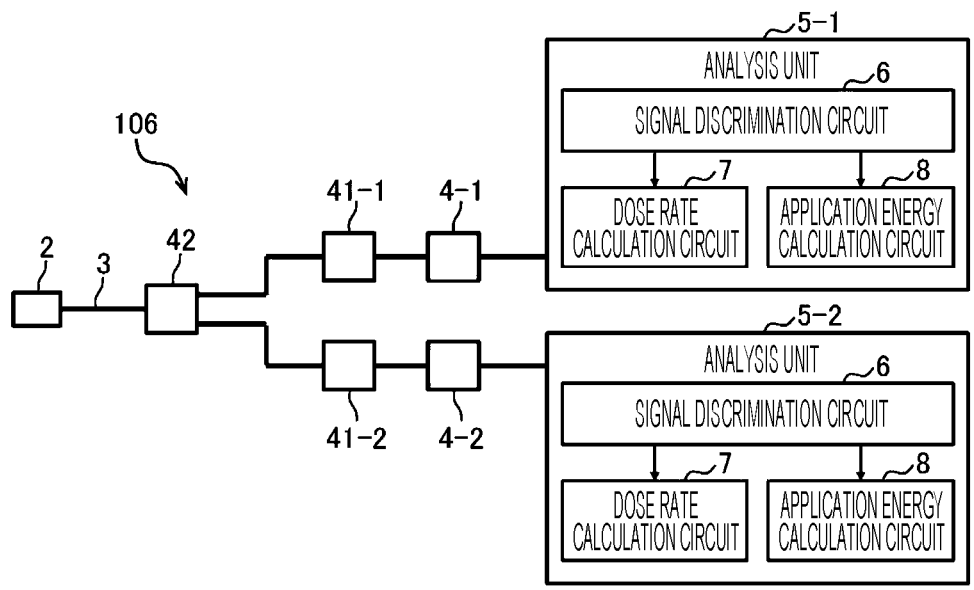
FIG. 16 is a schematic block diagram of a radiation monitoring device according to a sixth embodiment.

FIG. 16 is a schematic block diagram of a radiation monitoring device 106 according to a sixth embodiment. Note that parts corresponding to the respective units of the other embodiments described above will be denoted by the same reference signs in the following description, and descriptions thereof will be omitted in some cases.

The radiation monitoring device 106 is different from the radiation monitoring device 105 of the fifth embodiment (see FIG. 15) in that each of the optical filters 41-1 and 41-2 is inserted between the optical branching device 42 and each of the photodetectors 4-1 and 4-2. These optical filters 41-1 and 41-2 are similar to those of the fourth embodiment (see FIG. 14). Note that the radiation detection unit 2, the optical transmission unit 3, the optical branching device 42, the photodetectors 4-1 and 4-2, and the analysis units 5-1 and 5-2 are configured similarly to those of the fifth embodiment.

As described above, it is possible to apply the optimum optical filters 41-1 and 41-2 different for each path of divided photons according to the present embodiment. As a result, measurement accuracy of a dose rate and accuracy of energy analysis can be further improved.

Seventh Embodiment

Figure 17:
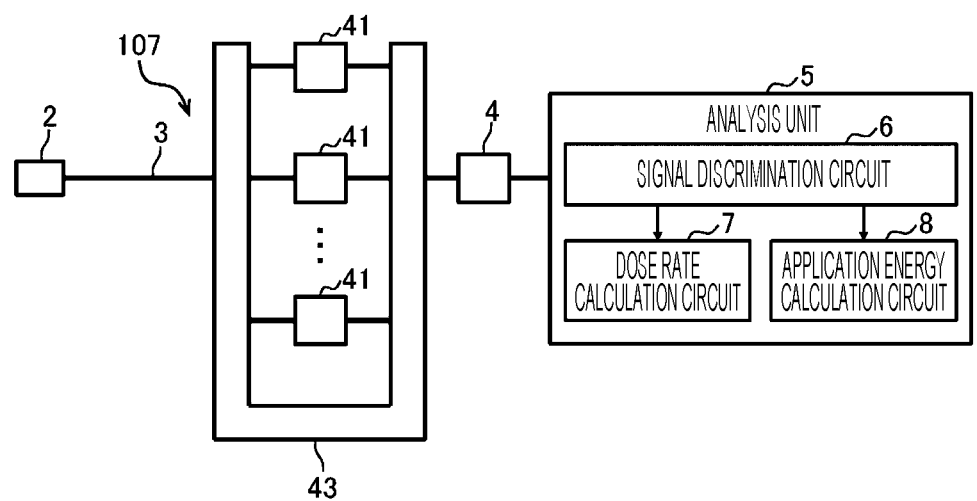
FIG. 17 is a schematic block diagram of a radiation monitoring device according to a seventh embodiment.

FIG. 17 is a schematic block diagram of a radiation monitoring device 107 according to a seventh embodiment. Note that parts corresponding to the respective units of the other embodiments described above will be denoted by the same reference signs in the following description, and descriptions thereof will be omitted in some cases.

The radiation monitoring device 107 is different from the radiation monitoring device 101 of the first embodiment (see FIG. 1) in that a plurality of the optical filters 41 and an optical filter selection unit 43 are provided between the optical transmission unit 3 and the photodetector 4. Note that configurations of the radiation detection unit 2, the optical transmission unit 3, the photodetector 4, the analysis unit 5, the signal discrimination circuit 6, the dose rate calculation circuit 7, and the application energy calculation circuit 8 are similar to those of the first embodiment.

The plurality of optical filters 41 perform filtering, that is, attenuation of the number of photons, transmission of light having a wavelength within a predetermined range, and the like on photons transmitted from the optical transmission unit 3 by different characteristics. The optical filter selection unit 43 selects any one optical filter 41 from among the plurality of optical filters 41 and connects the selected optical filter between the optical transmission unit 3 and the photodetector 4.

Therefore, it is possible to effectively select a plurality of light emission phenomena having different decay time constants of the photons transmitted from the optical transmission unit 3 or decomposition into single photons depending on the optical filter 41 to be selected. The optical filter selection unit 43 is not particularly limited as long as any one of the plurality of optical filters 41 can be selected. For example, a filter wheel type or a drop-in type in which the optical filter 41 is selected in a motor-driven manner or manually can be adopted as the optical filter selection unit 43.

Since the plurality of optical filters 41 that filter the photons transmitted from the radiation detection unit 2 and the optical filter selection unit 43 that selects any one of the optical filters 41 are provided according to the present embodiment as described above, the optical filter 41 to be applied can be selected according to an application. As a result, measurement accuracy of a dose rate and accuracy of energy analysis can be further improved. Further, the number of members, such as the photodetector 4, the analysis unit 5, the signal discrimination circuit 6, the dose rate calculation circuit 7, and the application energy calculation circuit 8, is reduced, so that it is possible to achieve saving of an installation space, reduction of an introduction cost and an operation cost, and reduction of the number of inspection items and processes at the time of maintenance by downsizing the radiation monitoring device 107. Furthermore, according to the present embodiment, variations in measurement accuracy of a dose rate and energy analysis due to the influence of an individual difference of the photodetector 4 are reduced, and the measurement accuracy of the dose rate and accuracy of the energy analysis can be further improved.

[Modifications]

The present invention is not limited to the above-described embodiments, and can include various modifications. The above-described embodiments have been exemplified in order to describe the present invention in an easily understandable manner, and are not necessarily limited to one including the entire configuration that has been described above. Further, configurations of another embodiment can be substituted for some configurations of a certain embodiment, and a configuration of another embodiment can be added to a configuration of a certain embodiment. Further, deletion, or addition or substitution of other configurations can be made with respect to some configurations of each embodiment. Further, only a control line and an information line illustrated in the drawings considered to be necessary for the description have been illustrated, and all control lines and information lines required for a product are not illustrated. It may be considered that most of the configurations are practically connected to each other.

REFERENCE SIGNS LIST 2 radiation detection unit
3 optical transmission unit
4, 4-1, 4-2 photodetector
5, 5-1, 5-2 analysis unit 6 signal discrimination circuit
7 dose rate calculation circuit
8 application energy calculation circuit
31 area to be measured
41, 41-1, 41-2 optical filter
42 optical branching device
43 optical filter selection unit
51 phosphor
101, 101-1, 101-2, 102 to 107 radiation monitoring device

The invention claimed is:

1. A radiation monitor device comprising:
a radiation detection unit including a phosphor that emits light by incident radiation;
a photodetector that converts a single photon or a photon group having a plurality of the single photons generated by the radiation detection unit into an electric pulse signal;
a signal discrimination circuit coupled to the photodetector;
a dose rate calculation circuit coupled to the signal discrimination circuit; and
an application energy calculation circuit coupled to the signal discrimination circuit,
wherein the phosphor emits light based on a plurality of light emission phenomena having different decay time constants, and
wherein the signal discrimination circuit discriminates the electric pulse signal output from the photodetector by determining whether the electric pulse signal is of a signal of a photon group or of a single photon,
wherein the dose rate calculation circuit calculates a dose rate of the radiation based on a count rate of the discriminated electric pulse signal, and
wherein the application energy calculation circuit calculates an application energy of the radiation based on a peak value of the discriminated electric pulse signal.

2. The radiation monitor device according to claim 1,
wherein the signal discrimination circuit discriminates the electric pulse signal based on determining whether a peak value of the electric pulse signal output from the photodetector is greater than a predetermined peak value threshold.

3. The radiation monitor device according to claim 2,
wherein the signal discrimination circuit, upon determining the peak value of the electric pulse is equal to or greater than the peak value threshold, the electric pulse signal is determined to be of a signal of a photo group, and upon determining the peak value of the electric pulse is less than the peak value threshold, the electric pulse signal is determined to be of a signal of a single photon.

4. The radiation monitor device according to claim 1,
wherein the signal discrimination circuit discriminates the electric pulse signal based on a relationship between a time width of the electric pulse signal output from the photodetector and a predetermined time width threshold.

5. The radiation monitor device according to claim 1,
wherein the signal discrimination circuit discriminates the electric pulse signal based on a relationship between an integration result of the electric pulse signal output from the photodetector and a predetermined integration result threshold.

6. The radiation monitor device according to claim 1,
wherein the signal discrimination circuit discriminates the electric pulse signal based on a frequency characteristic of the electric pulse signal output from the photodetector.

7. The radiation monitor device according to claim 1,
wherein the signal discrimination circuit discriminates the electric pulse signal based on a peak value spectrum of the electric pulse signal output from the photodetector.

8. The radiation monitor device according to claim 1, further comprising
an optical filter that filters a photon transmitted from the radiation detection unit.

9. The radiation monitor device according to claim 1, further comprising:
an optical switch that routes photons transmitted from the radiation detection unit,
wherein a plurality of the photodetectors are provided, and each of the photodetectors converts photons routed by the optical switch into the electric pulse signal, and
the plurality of photodetectors are connected to the signal discrimination circuit.

10. The radiation monitor device according to claim 9,
wherein a plurality of the signal discrimination circuits are provided to correspond to the photodetectors, and
wherein the plurality of photodetectors are connected to the corresponding signal discrimination units, respectively.

11. The radiation monitor device according to claim 1, further comprising:
a plurality of optical filters that filter a photon transmitted from the radiation detection unit; and
an optical filter selection unit that selects any of the optical filters.

12. The radiation monitor device according to claim 1, further comprising:
an optical transmission unit that connects the radiation detection unit and the photodetector,
wherein the radiation detection unit is provided inside a predetermined area to be measured,
wherein the photodetector and the signal discrimination circuit are provided outside the area to be measured, and
wherein the dose rate and the application energy inside the area to be measured are measured.

* * * * *